(12) United States Patent
Szabó et al.

(10) Patent No.: US 12,436,527 B2
(45) Date of Patent: Oct. 7, 2025

(54) TECHNIQUE FOR PERFORMING QOS CONTROL IN A CLOUD ROBOTICS SYSTEM

(71) Applicant: Telefonaktiebolaget LM Ericsson (publ), Stockholm (SE)

(72) Inventors: Géza Szabó, Kecskemet (HU); Attila Báder, Paty (HU); Sándor Rácz, Cegléd (HU); Norbert Reider, Tényö (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 201 days.

(21) Appl. No.: 18/036,453

(22) PCT Filed: Nov. 18, 2020

(86) PCT No.: PCT/EP2020/082505
§ 371 (c)(1),
(2) Date: May 11, 2023

(87) PCT Pub. No.: WO2022/105992
PCT Pub. Date: May 27, 2022

(65) Prior Publication Data
US 2023/0400842 A1    Dec. 14, 2023

(51) Int. Cl.
*G05B 19/418*    (2006.01)
(52) U.S. Cl.
CPC ... *G05B 19/41875* (2013.01); *G05B 19/4185* (2013.01)
(58) Field of Classification Search
CPC .......... G05B 19/41875; G05B 19/4185; G05B 2219/31094; G05B 2219/33243; H04W 28/24; B25J 9/1602
See application file for complete search history.

(56) References Cited

U.S. PATENT DOCUMENTS

| 8,947,522 | B1 | 2/2015 | Hickman et al. |
| 9,144,907 | B2 | 9/2015 | Summer et al. |
| 2016/0371987 | A1* | 12/2016 | Kotecha ............... G08G 5/55 |

FOREIGN PATENT DOCUMENTS

| JP | 2020156084 A | 9/2020 |
| WO | 2019238215 A1 | 12/2019 |
| WO | 2020104946 A1 | 5/2020 |

OTHER PUBLICATIONS

G. Szabó, S. Rácz, N. Reider, J. Petö and R. Roque Aschoff, "Quality of Control-Aware Resource Allocation in 5G Wireless Access Networks," 2018 IEEE 19th International Symposium on "A World of Wireless, Mobile and Multimedia Networks" (WoWMoM), Chania, Greece, 2018, pp. 1-6 (Year: 2018).*

(Continued)

*Primary Examiner* — Adam R Mott
*Assistant Examiner* — Matthew C Gammon
(74) *Attorney, Agent, or Firm* — Withrow & Terranova, PLLC (57) ABSTRACT

A technique for performing Quality of Service, QoS, control regarding control messages communicated from a robot controller to a robot via a mobile communication network in a cloud robotics system is disclosed. A method implementation of the technique comprises triggering applying a mapping of control messages communicated from the robot controller to the robot to QoS classes among a plurality of data session related QoS classes supported by the mobile communication network for transmission of traffic via the mobile communication network, wherein each of the control messages is mapped to a respective QoS class depending on a Quality of Control, QoC, tolerance associated with the respective control message.

19 Claims, 5 Drawing Sheets

(56) References Cited

OTHER PUBLICATIONS

B. Hu, H. Wang, P. Zhang, B. Ding and H. Che, "Cloudroid: A Cloud Framework for Transparent and QoS-Aware Robotic Computation Outsourcing," 2017 IEEE 10th International Conference on Cloud Computing (Cloud), Honololu, HI, USA, 2017, pp. 114-121 (Year: 2017).*

Author Unknown, "Technical Specification Group Services and System Aspects; System architecture for the 5G System (5GS); Stage 2 (Release 16)," Technical Specification 23.501, Version 16.3.0, Dec. 2019, 3GPP Organizational Partners, 417 pages.

Leng, Yan, "Semantics-Aware Planning Methodology for Automatic Web Service Composition," Disseration, University of Bonn, Bonn, Germany, Jun. 29, 2012, 116 pages.

Szabo, et al., "Quality of Control-aware Resource Allocation in 5G Wireless Access Networks," 19th International Symposium on WOWMOM, Jun. 12, 2018, IEEE, 6 pages.

International Search Report and Written Opinion for International Patent Application No. PCT/IB2020/082505, mailed Jul. 27, 2021, 14 pages.

* cited by examiner

TECHNIQUE FOR PERFORMING QOS CONTROL IN A CLOUD ROBOTICS SYSTEM

This application is a 35 U.S.C. § 371 national phase filing of International Application No. PCT/EP2020/082505, filed Nov. 18, 2020, the disclosure of which is incorporated herein by reference in its entirety.

TECHNICAL FIELD

The present disclosure generally relates to the field of cloud robotics. In particular, a technique for performing Quality of Service (QoS) control regarding control messages communicated from a robot controller to a robot via a mobile communication network in a cloud robotics system is presented. The technique may be embodied in methods, computer programs, apparatuses and systems.

BACKGROUND

In recent years, there has been an increasing demand for the manufacturing industry to provide customized products. Personalized production is one of the key motivations for manufacturers to start leveraging new technologies that enable improving the flexibility of production lines. To realize cost effective and customized production by supporting fast reconfiguration of production lines, high flexibility as well as facilitated application development is needed.

In 5G mobile communication systems, Ultra-Reliable Low-Latency Communication (URLLC) has been introduced as a new service that provides low latency and ultra-high reliability for mission-critical applications, such as robotics, industrial automation, autonomous vehicles, smart grids, remote surgery, and the like. One of the challenging applications in which the capabilities of URLLC can be well demonstrated is the low-level remote control of robotic servos. Industrial applications, such as robot arms and robot cell control typically require a massive collaboration on the controlled servos, which makes the use cases demanding from a remote control perspective.

The aspect of latency in robot control has been addressed in various forms. Patent publication U.S. Pat. No. 9,144,907 B2, for example, discloses a processing device which determines a difference between a current pose and an earlier pose of a robot and, based on such comparison, selectively transforms a robot command to a latency-corrected robot command. Patent publication U.S. Pat. No. 8,947,522 B1, for example, discloses a method to provide data generated based on an execution of an action of a robotic device to a server and receive information indicative of latency attributable to communication between the robotic device and the server. When the latency is above a threshold, the method may identify information of the generated data having a given priority above a threshold level and provide a reduced resolution version of the identified information to the server. Patent application WO 2019/238215 A1, for example, discloses a controller configured to obtain an action that is to be performed by a robotic device and to determine a Quality of Control (QoC) level that is associated with the action. The controller is further configured to trigger a setting of at least one transmission parameter for a wireless transmission of a command pertaining to the action, wherein the transmission parameter setting is dependent on the QoC level determined for the action.

An industrial robot has many metrics and measurable characteristics, which have a direct impact on the robustness of the robot during the execution of its tasks. The main measurable characteristics are repeatability and accuracy. Repeatability of a robot may relate to the robot's ability to achieve a repetition of the same task, and accuracy may relate to a measure of difference (i.e., an error) between the requested task and the realized task (i.e., the task actually achieved by the robot). In other words, it may be said that repeatability relates to doing the same task over and over again, whereas accuracy relates to hitting the target each time. The objective is to have a robot that can repeat its actions while hitting the target every time. When current mass production assembly lines are designed, robots are typically deployed to repeat a limited set of tasks as accurately as possible, and at the same time as fast as possible, to maximize productivity while minimizing the number of faulty parts.

In the context of competing target values, such as accuracy and production speed, current robot control methods do not always provide optimum resource utilization in the control, networking and manufacturing domains. Many applications are dedicated to accuracy and leave room for improvements in the manufacturing cycle times, for example. Also, while manufacturers generally aim at moving towards wireless technologies inside factories to more easily support personalized production needs, frequency spectrum is a scarce resource and resource limitations in wireless communication need to be taken into consideration as well.

SUMMARY

Accordingly, there is a need for a technique which allows enhancing resource utilization in a cloud robotics system.

According to a first aspect, a method for performing QoS control regarding control messages communicated from a robot controller to a robot via a mobile communication network in a cloud robotics system is provided. The method comprises triggering applying a mapping of control messages communicated from the robot controller to the robot to QoS classes among a plurality of data session related QoS classes supported by the mobile communication network for transmission of traffic via the mobile communication network. Each of the control messages is mapped to a respective QoS class depending on a QoC tolerance associated with the respective control message.

The QoC tolerance associated with the respective control message may be predefined in accordance with an accuracy required by the robot for a control task to be performed in accordance with the respective control message. Control messages belonging to a same control task to be performed by the robot may be assigned the same QoC tolerance.

The plurality of data session related QoS classes may comprise at least a first QoS class and a second QoS class. The first QoS class may have stricter QoS requirements than the second QoS class. Among a plurality of control messages communicated from the robot controller to the robot, control messages having a lower QoC tolerance compared to other control messages of the plurality of control messages may be mapped to the first QoS class and the other control messages may be mapped to the second QoS class. The second QoS class may be representative for best effort delivery of messages. The second QoS class may have the least strict QoS requirements among the plurality of data session related QoS classes.

Control of the robot by the robot controller may be performed via a data session established by the mobile communication network. The data session may comprise a plurality of carriers through which traffic may flow. Through each of the plurality of carriers, traffic may be conveyed in accordance with a different QoS class of the plurality of data session related QoS classes. The carriers may correspond to QoS flows of a 5G network and the QoS classes correspond to 5G QoS Identifier (5QI) classes.

The mapping may be adjusted based on QoC feedback provided by at least one of the robot and the robot controller. The QoC feedback may be analyzed by an analytics component of the mobile communication network. The method may be performed by one of an analytics component of the mobile communication network, a policy control component of the mobile communication network and a gateway component of the mobile communication network. The mapping may be applied via a policy control component of the mobile communication network.

When the QoC feedback indicates that the QoC tolerance associated with at least one of the control messages is exceeded, the mapping of corresponding control messages may be changed to a QoS class having stricter QoS requirements than the QoS class associated with the at least one of the control messages. Changing the mapping of the corresponding control messages to a QoS class having stricter QoS requirements may be repeatedly performed until QoC feedback provided by at least one of the robot and the robot controller indicates that the QoC tolerance associated with the corresponding control messages is not exceeded.

When the QoC feedback indicates that the QoC tolerance associated with at least some of the control messages is kept for a predetermined amount of time, the mapping of corresponding control messages may be changed to a QoS class having less strict QoS requirements than the QoS class of the at least some of the control messages to determine whether the QoS class having less strict QoS requirements is sufficient to keep the QoC tolerance associated with the corresponding control messages. The QoC feedback may be monitored only for QoS classes having stricter QoS requirements than the QoS class having the least strict QoS requirements among the plurality of data session related QoS classes to adjust the mapping.

The QoC tolerance associated with the respective control message may be defined using a planning language for specifying control tasks to be performed by the robot. The planning language may support defining at least one of tolerance values specifying allowable inaccuracies when performing control tasks, predicates specifying conditions to be satisfied upon performing control tasks, and soft constraints specifying conditions that should, but not necessarily have to, be satisfied upon performing control tasks. The conditions may relate to at least one of a placement of an item after performing the control task, and an accumulated inaccuracy resulting from performing the control task.

According to a second aspect, a computer program product is provided. The computer program product comprises program code portions for performing the method of the first aspect when the computer program product is being executed on one or more computing devices, e.g., on a network node. The computer program product may be stored on a computer readable recording medium, such as a semiconductor memory, DVD, CD-ROM, and so on.

According to a third aspect, a computing unit for performing QoS control regarding control messages communicated from a robot controller to a robot via a mobile communication network in a cloud robotics system is provided. The computing unit comprises at least one processor and at least one memory, the at least one memory containing instructions executable by the at least one processor such that the computing unit is operable to perform any of the method steps presented herein with respect to the first aspect.

According to a fourth aspect, there is provided a system comprising a computing unit, a robot and a robot controller according to the third aspect.

According to the present disclosure, improved productivity of robots may be achieved since, by relaxing QoC tolerances, robot arms may generally move faster. The targeted quality may still remain the same because users may explicitly define parts of the process which may have higher QoC tolerances. When robot control is performed through a mobile communication network (e.g., a 5G network), different control messages may be mapped to different QoS classes (e.g., 5QI classes), e.g., by an analytics component of the mobile communication network. High priority messages may be mapped to stringent and expensive QoS classes (e.g., URLLC), whereas other messages may be mapped to normal (or "default") classes providing best effort packet delivery services. As a result, utilization of radio and network resources may be improved. By continuously monitoring whether QoC targets are met, such as by the analytics component (e.g., by an assurance service thereof), QoC violations may be identified and, in case of insufficient QoC level (e.g., due to poor network conditions), control messages may be mapped to higher priority QoS classes (e.g., 5QI classes) in order to automatically eliminate QoC violation.

BRIEF DESCRIPTION OF THE DRAWINGS

Implementations of the technique presented herein are described herein below with reference to the accompanying drawings, in which.

DETAILED DESCRIPTION

In the following description, for purposes of explanation and not limitation, specific details are set forth in order to provide a thorough understanding of the present disclosure. It will be apparent to one skilled in the art that the present disclosure may be practiced in other embodiments that depart from these specific details.

Those skilled in the art will further appreciate that the steps, services and functions explained herein below may be implemented using individual hardware circuitry, using software functioning in conjunction with a programmed microprocessor or general purpose computer, using one or more application specific integrated circuits (ASICs) and/or using one or more digital signal processors (DSPs). It will also be appreciated that when the present disclosure is described in terms of a method, it may also be embodied in one or more processors and one or more memories coupled to the one or more processors, wherein the one or more memories are encoded with one or more programs that perform the steps, services and functions disclosed herein when executed by the one or more processors.

Figure 1:
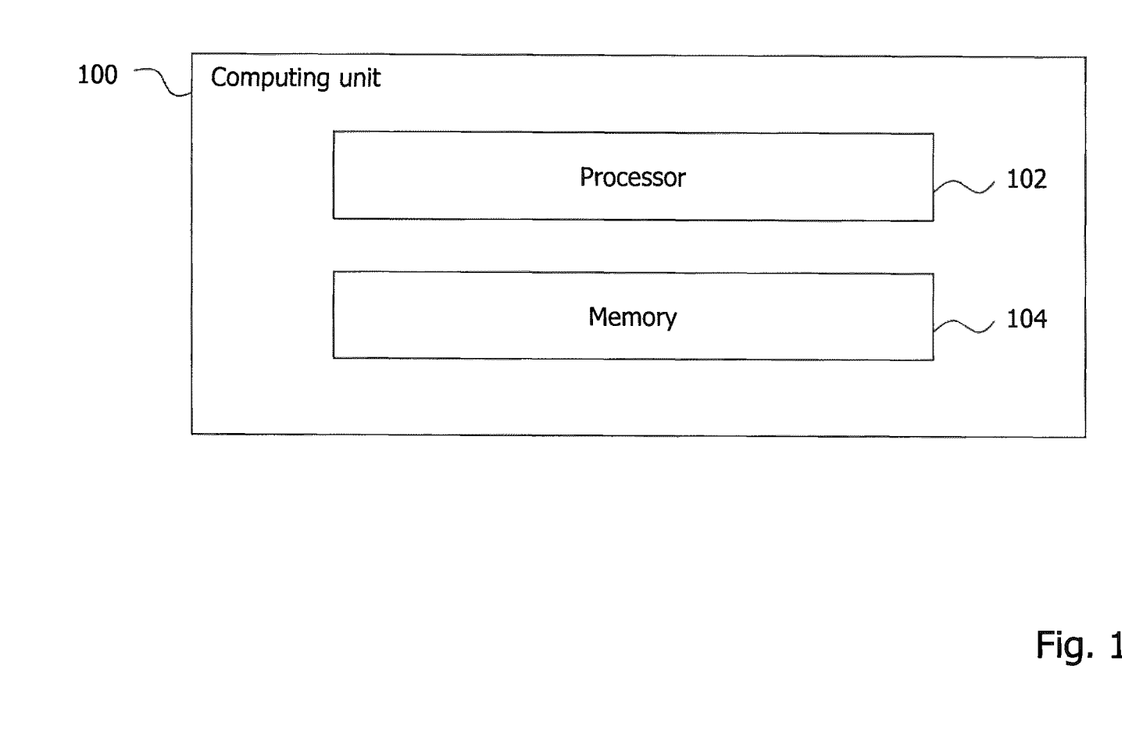
FIG. 1 illustrates an exemplary composition of a computing unit for performing QoS control regarding control messages according to the present disclosure.

FIG. 1 schematically illustrates an exemplary composition of a computing unit 100 for performing QoS control regarding control messages communicated from a robot controller to a robot via a mobile communication network in a cloud robotics system. The computing unit 100 comprises at least one processor 102 and at least one memory 104, wherein the at least one memory 104 contains instructions executable by the at least one processor 102 such that the computing unit 100 is operable to carry out the method steps described herein below.

It will be understood that the computing unit 100 may be implemented on a physical computing unit or a virtualized computing unit, such as a virtual machine, for example. It will further be appreciated that the computing unit 100 may not necessarily be implemented on a standalone computing unit, but may be implemented as components—realized in software and/or hardware—residing on multiple distributed computing units as well, such as in a cloud computing environment, for example.

Figure 2:
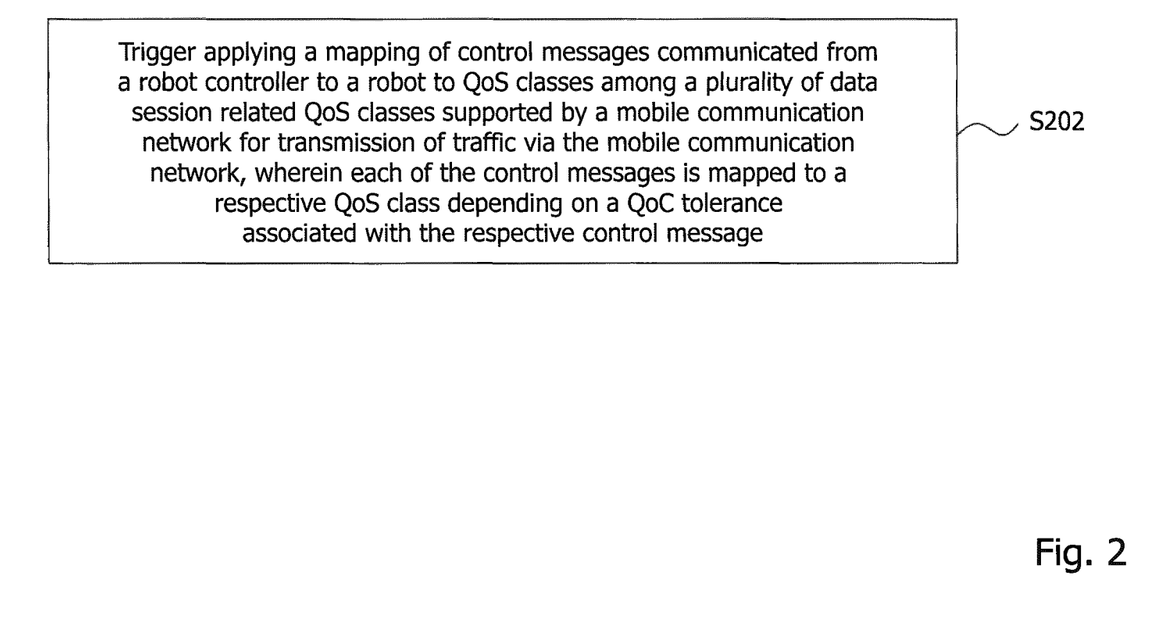
FIG. 2 illustrates a method which may be performed by the computing unit according to the present disclosure.

FIG. 2 illustrates a method which may be performed by the computing unit 100 according to the present disclosure. The method is dedicated to performing QoS control regarding control messages communicated from a robot controller to a robot via a mobile communication network in a cloud robotics system. In step S202, the computing unit 100 may trigger applying a mapping of control messages communicated from the robot controller to the robot to QoS classes among a plurality of data session related QoS classes supported by the mobile communication network for transmission of traffic via the mobile communication network, wherein each of the control messages is mapped to a respective QoS class depending on a QoC tolerance associated with the respective control message.

A QoC tolerance may relate to a tolerance which is defined to be acceptable when the robot performs a particular control task or, in other words, a tolerance by which it is allowed for the robot to perform the particular task. A QoC tolerance may as such be considered as a goal tolerance defining a certain limit within which a pose of the robot (resulting from the control messages being communicated to the robot while performing the task or after performing the task) is allowed/accepted to be altered. Exemplary robot tasks may include welding, painting, assembling, disassembling, picking and placing, packaging, labeling, palletizing, inspecting (e.g., product inspection), testing, and the like. Each such task may be predefined to require a certain accuracy and thereby allow a certain QoC tolerance. Tasks may thus be categorized (e.g., by a user) according to the kind of accuracy they require and corresponding QoC tolerances may be assigned to the tasks accordingly. As a mere example, the required accuracy of a pick and place action for a circuit board may be defined higher than the required accuracy of the same action for a cornflakes box. A task may also be divided into subtasks and QoC tolerances may similarly be assigned to subtasks.

Each control message communicated to the robot required to perform the particular task may be associated with (or "assigned to") a corresponding QoC tolerance and, depending on this QoC tolerance, the control message may be mapped to a QoS class required to support the QoS in wireless transmission necessary to comply with the desired QoC tolerance. The QoC tolerance associated with the respective control message may thus be predefined in accordance with an accuracy required by the robot for a control task to be performed in accordance with the respective control message. Although it is generally conceivable that each control message is associated with (or "assigned to") a separate QoC tolerance, it will be understood that, in some variants, control messages belonging to a same control task to be performed by the robot may be assigned the same QoC tolerance.

By mapping control messages communicated from the robot controller to the robot to QoS classes depending on QoC tolerances associated with the respective control messages, control messages having a lower QoC tolerance (e.g., higher priority messages) may be communicated with a higher QoS in wireless transmission (using a higher QoS class supported by the mobile communication network) as compared to other control messages having a comparably higher QoC tolerance (e.g., lower priority messages), wherein the other messages may be communicated with a comparably lower QoS in wireless transmission (using a lower QoS class supported by the mobile communication network). In this way, goal tolerances may be relaxed for tasks that require less accuracy and, by using lower QoS for the corresponding control messages, the use of wireless network resources may generally be optimized, while ensuring desired QoC targets at the same time. Also, productivity of robot cells may be improved since relaxing the goal tolerances may allow the robot arms to move faster, while ensuring desired quality targets given the predefined goal tolerances to be complied with.

In the cloud robotics system, the robot controller may be executed in a cloud (i.e., more specifically, in a cloud computing environment) and the robot may be a robot that communicates with the robot controller via the mobile communication network to exchange messages required for control of the robot. Control messages communicated from the robot controller to the robot may correspond to commands, such as movement or velocity commands, instructing the robot to carry out corresponding actions. The wireless communication network may be a 5G network, for example, but it will be understood that other types of wireless communication networks may be employed as well, such as 4G networks, for example. For communication between the robot and the robot controller, the mobile communication network may establish a data session for the robot, such as a Protocol Data Unit (PDU) session in case of a 5G network or a Packet Data Network (PDN) connection in case of a 4G network, for example (the data session corresponding to a logical connection set up by the mobile communication network between the robot and the robot controller).

As said, by mapping control messages to QoS classes depending on QoC tolerances, control messages having a lower QoC tolerance may be communicated with a higher QoS as compared to other control messages, and vice versa. Control messages may in other words be marked as more stringent or less stringent and may be mapped to different QoS classes accordingly. In one variant, high priority control messages may be mapped to an ultra-reliable and low-latency QoS class (e.g., supporting URLLC), for example, whereas some of all of the remaining control messages may be mapped to a normal (or "default") QoS class providing a best effort package delivery service. The plurality of data session related QoS classes may thus comprise at least a first QoS class and a second QoS class, the first QoS class having stricter QoS requirements than the second QoS class, wherein, among a plurality of control messages communicated from the robot controller to the robot, control messages having a lower QoC tolerance compared to other control messages of the plurality of control messages may be mapped to the first QoS class and the other control messages may be mapped to the second QOS class. The second QoS class may be representative for best effort delivery of messages and, optionally, have the least strict QoS requirements among the plurality of data session related QoS classes. It will be understood that the distinction of two QoS classes in the above example is merely exemplary and that the plurality of data session related QoS classes may also comprise more than two QoS classes, wherein control messages having lower QoC tolerance may be mapped to QoS classes having stricter QoS requirements and control messages having comparably higher QoC tolerance may be mapped to QoS classes having comparably less strict QoS requirements.

In one implementation, when control of the robot is performed via a data session established by the mobile communication network between the robot and the robot controller, the QoS classes to which the control messages are mapped may be associated with the carriers of the data session through which traffic may flow. Control of the robot by the robot controller may thus be performed via a data session established by the mobile communication network, wherein the data session may comprise a plurality of carriers through which traffic may flow, and wherein, through each of the plurality of carriers, traffic may be conveyed in accordance with a different QoS class of the plurality of data session related QoS classes supported by the mobile communication network. In case of a 5G network, for example, where the data session may correspond to a PDU session established by the mobile communication network, the mobile communication network may establish at least two QoS flows as part of the PDU session, wherein each of these QoS flows may be mapped to a different 5QI class. The carriers may thus correspond to QoS flows of a 5G network and the QoS classes may correspond to 5QI classes, for example.

5QI classes may be defined to guarantee certain QoS targets, including parameters like packet delay, loss targets or traffic forwarding priorities, for example. While 5G networks provide standardized 5QI classes, the skilled person will appreciate that 5G specifications also allow defining proprietary 5QI classes, e.g., classes defined by an operator of the mobile communication network (see 3GPP TS 23.501 V16.3.0 (2019-12), for example). As a mere example for standardized 5QI classes, stringent messages may be mapped to 5QI class "69", which is representative of QoS requirements/parameters suitable for mission-critical delayed sensitive signaling, whereas non-stringent messages may be mapped to 5QI class "6", which is representative of QoS requirements/parameters suitable for best effort Mobile Broadband (MBB) services. It will be understood such mapping is merely exemplary and that other mappings may be applied in other wireless communication networks. In a 4G network, for example, the data session may correspond to a PDN connection established by the mobile communication network between the robot and the robot controller, wherein at least two bearers may be established for the PDN connection, and wherein each of these bearers may be associated with (or "assigned to") a different QoS Class Identifier (QCI).

As said, the method presented herein may comprise applying a mapping of control messages to the available QoS classes. Such mapping may be adjusted over time depending on the circumstances, such as the behavior of the robot observed by the robot controller or the robot itself or, in other words, depending on feedback on the observed QoC of the robot's tasks actually being performed. The mapping may as such be adjusted based on QoC feedback provided by at least one of the robot and the robot controller.

Figure 3:
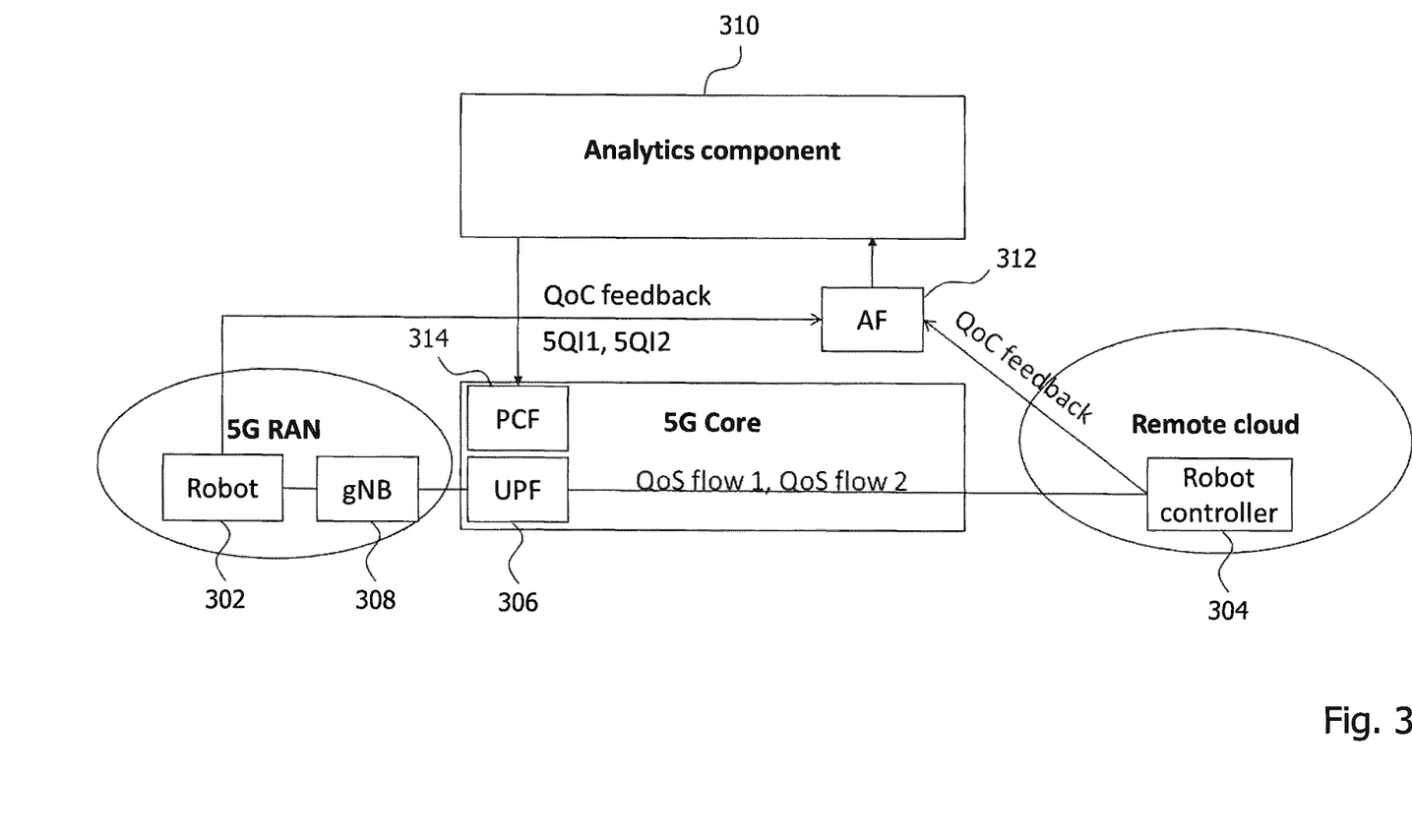
FIG. 3 illustrates an exemplary architecture according to which QoC feedback may be provided and used to apply a mapping of control messages to QoS classes according to the present disclosure.

FIG. 3 illustrates an exemplary architecture according to which such feedback may be provided and used to apply the mapping of control messages to QoS classes. In the shown example, which exemplifies the technique presented herein in a 5G network, a robot 302 is controlled by a robot controller 304 executed in a remote cloud computing environment. A PDU session comprising QoS flows 1 and 2 is established on the user plane of the network and corresponding traffic is communicated between the robot controller 304 and the robot 302 via a User Plane Function (UPF) 306, acting as gateway and residing in the Core Network (CN) of the system, as well as via a next generation NodeB (gNB) 308 residing in the Radio Access Network (RAN) of the 5G system. Both the robot 302 and the robot controller 304 may provide QoC feedback to an analytics component 310 of the 5G network (as shown in the figure, optionally via an Application Function (AF) 312 for example). Since user plane traffic may be encrypted in the CN, it is to be noted that such QoC feedback may not be possible (or at least difficult) to obtain in the CN, which is why the QoC feedback may preferably be provided from the robot 302 and the robot controller 304, i.e., from the respective communication endpoints. The analytics component 310 may analyze the received QoC feedback and decide on whether the applied mapping of control messages to QoS classes may need to be adjusted. If an adjustment is needed, the adjustment may be enforced via a policy control component, such as a Policy Control Function (PCF) 314 of the 5G network, for example. The PCF 314, in turn, may enforce the mapping on the UPF 306, which may then effectively apply the mapping on actual traffic communicated between the robot controller 304 and the robot 302.

In view of the above, it will be understood that the actual mapping of control messages to QoS classes may be applied (i.e., in the sense of actually being "performed" "effected") by a gateway component, such as the UPF 306, wherein applying such mapping (i.e., in the sense of "configuring"/"enforcing"/"activating" such mapping) may be triggered by components, such as the PCF 314 or the analytics component 310 (also the gateway component may be said to "trigger" applying such mapping). "Triggering applying a mapping of control messages to QoS classes" as generally described above with reference to FIG. 2 may thus be understood as an action performed by each of such components, e.g., including the analytics component 310, the PCF 314, and the UPF 306. In other words, the method described herein may be performed by (e.g., at least) one of an analytics component of the mobile communication network, a policy control component of the mobile communication network and a gateway component of the mobile communication network. In one particular variant, the QoC feedback may be analyzed by an analytics component of the mobile communication network, and the mapping may be applied via a policy control component of the mobile communication network, as depicted in FIG. 3, for example.

The QoC feedback may be indicative of whether or not a predefined QoC tolerance associated with one or more control messages is complied with. In case of QoC tolerance violation, e.g., when the QoC feedback indicates that the QoC tolerance associated with at least one of the control messages is exceeded, the mapping of corresponding control messages may be changed to a QoS class having stricter QoS requirements than the QoS class associated with the at least one of the control messages. In other words, control messages of the same type or associated with the same control task of the robot may be remapped to a QoS class having stricter QoS requirements. Such remapping may be repeated iteratively until the QoC tolerance violation is resolved. Changing the mapping of the corresponding control messages to a QoS class having stricter QoS requirements may thus be repeatedly performed until QoC feedback provided by at least one of the robot and the robot controller indicates that the QoC tolerance associated with the corresponding control messages is not (or "no longer") exceeded. With reference to FIG. 3, for example, the analytics component 310 may trigger modifying the 5QI mapping of stringent control messages if QoC violation is detected (e.g., due to network bandwidth issues). If there are several QoS classes (e.g., URLLC classes) available in the network, they may be ranked based on priority, for example, and control traffic communicated to the robot 302 may be iteratively mapped to higher priority classes until the QoC violation is resolved.

If, once the violation is resolved, compliance with the QoC tolerance is stable for a certain amount of time, an attempt may be made to remap corresponding control messages to lower priority classes in order to possibly release (not necessarily needed) network resources again. When the QoC feedback thus indicates that the QoC tolerance associated with at least some of the control messages is kept for a predetermined amount of time, the mapping of corresponding control messages may be changed to a QoS class having less strict QoS requirements than the QoS class of the at least some of the control messages to determine whether the QoS class having less strict QoS requirements is sufficient to keep the QoC tolerance associated with the corresponding control messages.

In order to avoid expensive monitoring processes, QoC tolerance monitoring may be performed for mission-critical QoS classes only (at least not for the QoS class having the least strict QoS requirements, such as the QoS class representative for best effort delivery of messages mentioned above, for example). The QoC feedback may in other words be monitored only for QoS classes having stricter QoS requirements than the QoS class having the least strict QoS requirements among the plurality of data session related QoS classes to adjust the mapping.

As said, control tasks of the robot may be defined according to the kind of accuracy they require and corresponding QoC tolerances may be assigned to these tasks accordingly (or specifically to the control messages required to implement these tasks). Such definitions of QoS tolerance may be made using planning languages used by developers to specify the control tasks to be performed by the robot. The QoC tolerance associated with the respective control message may thus be defined using a planning language for specifying control tasks to be performed by the robot. Such planning languages may comprise languages like the Planning Domain Definition Language (PDDL), for example, or specific robot programming languages, such as URScript (which is a programming language provided by Universal Robots to control robots like UR5, for example).

As will be appreciated by one of skill in the art, using planning languages, a robot (or, more generally, a "robot cell") may be modeled in a suitable manner and a planner may create planning solutions accordingly, which may then be executed in a plan dispatcher, for example. In order to enable defining QoC tolerances, as described above, the syntax of planning languages may be extended to allow defining, e.g., for each action of a robot, the need to determine if the robot can meet the given goal requirements (i.e., the defined QoC tolerance). As a mere example, the following provides a sample definition in the PDDL domain. For this sample, it is assumed that an industrial robot arm has to pick up different parts and place them into shipping boxes as per a given order.

```
(:durative-action ur_pick_fast
    :parameters (?ur - ur ?locationA - location ?locationB - location ?piece - piece)
    :duration (= ?duration 5)
    :condition
       (and
          (at start (ur_at ?ur ?locationA))
          (over all (ur_at ?ur ?locationA))
          (at start (is_ur_available ?ur))
          (over all (is_reachable ?locationA ?locationB))
          (at start (is_in ?piece ?locationB))
       )
    :effect
       (and
          (at end (is_ur_carry ?ur ?piece))
          (at end (not ((is_precise ?piece)))
          (at end (not (is_in ?piece ?locationB)))
          (at end (not (is_ur_available ?ur)))
          (at end (increase (inaccuracy) 10))
       )
)
```

In the PDDL sample code, the binary predicate "is_precise" (indicated in bold font) may be used as a precision predicate that allows defining, in the problem definition of the code, the requirement of a perfectly accurate placement. By statements, such as "increase (inaccuracy)" (also indicated in bold font above), accuracies or inaccuracies may also be cumulated in the problem definition, for example. Another option of defining allowed inaccuracies may involve modeling accumulated inaccuracy by tokens, for example, wherein, after a certain number of cumulated in accuracy tokens, the position of the robot may not be considered to be accurate. It will be understood that, by allowing such inaccuracies, the created plan may result in a reduction of execution time of the whole control task to be performed.

The following illustrates another PDDL code example, which explicitly allows defining goals, so that precision predicates may not have to be defined in the problem definition, but may be specified as explicit goals.

```
(:goal
    (and
        (is_in gear1 shippingbox1)
        (is_in gear2 shippingbox1)
        (is_in gear3 shippingbox1)
```

```
<If type="ElseIf" checkContinuously="false">
    <expression>
        <Expression QoC="="/>
        <ExpressionToken token=" False "/>
    </expression>
    <Move motionType="MoveL" speed="0.75" acceleration="2.4"
recalculateMotions="false">
        <feature class="GeomFeatureReference"
referencedName="Joint_0_name"/>
        <children>
            <Waypoint type="Fixed" name="Waypoint_1" kinematicsFlags="3">
                <goalTolerance ="0.01"/>
            </Waypoint>
        </children>
    </Move>
```

-continued

```
        (is_in gear4 shippingbox1)
        (is_in gear5 shippingbox1)
        ;perfectly accurate placement
        (is_precise gear4 shippingbox1)
        (is_precise gear5 shippingbox1)
    )
)
```

In order to support further relaxations, soft constraints may be used in the planning languages. A soft constraint may be a condition on the robot's trajectory generated by a plan that, by definition, should rather be satisfied than not satisfied, wherein it is accepted that the condition may not be satisfied, e.g., because of the cost of satisfying it, or because of conflicts with other constraints or goals. In case of multiple soft constraints, there may be a need to determine which of the various constraints is to take priority, if there is a conflict between them, or if it is costly to satisfy them. In PDDL, the syntax element "preferences" in the goal definition may be used for the definition of soft constraints, for example.

From the above, it may be summarized that the planning language may support defining at least one of tolerance values specifying allowable inaccuracies when performing control tasks, predicates specifying conditions to be satisfied upon performing control tasks, and soft constraints specifying conditions that should, but not necessarily have to, be satisfied upon performing control tasks. The conditions may relate to at least one of a placement of an item after performing the control task, and an accumulated inaccuracy resulting from performing the control task, for example.

Figure 4:
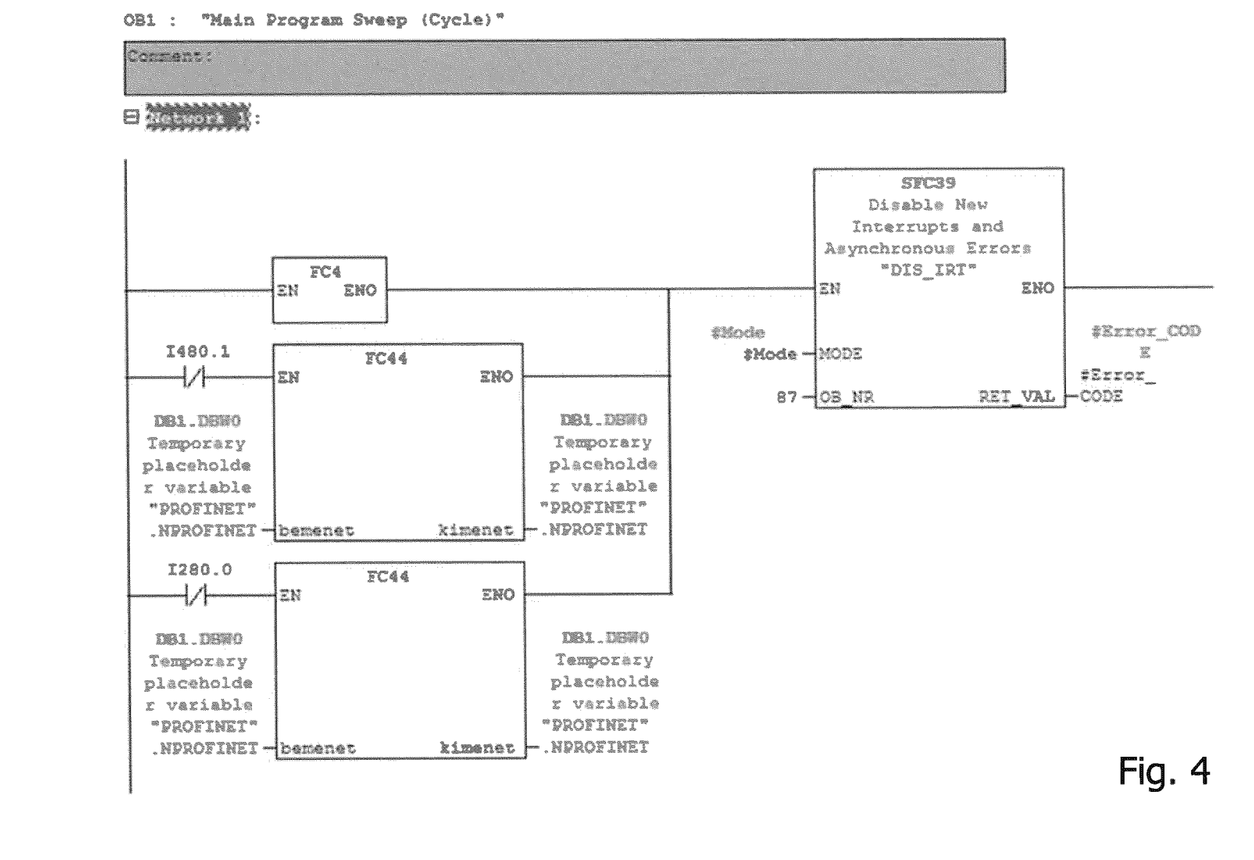
FIG. 4 illustrates an exemplary ladder logic as part of an example of specifying QoC tolerances using a planning language according to the present disclosure.

Another example of defining goal tolerances is illustrated in relation to FIG. 4, which shows a ladder logic to trigger QoC target alternation. In the shown example, a robot arm is controlled using a Programmable Logic Controller (PLC) program, wherein continuous goal tolerance is added into the execution. More specifically, as can be seen, the output values of the PLC program are written into the Profinet registers by the PLC. These values are then processed by a URScript program running on the robot arm (e.g., a UR5 robot). Depending on the status of the four switches in an I/O module, the following URScript instructions (shown below) are executed by the first switch to turn the robot on/off. The second switch changes the speed of the robot movement and the third switch changes the mode of movement between two points, wherein one mode is the tool space mode (when the end of the robot arm moves in a straight line between the two points) and the other mode is the joint space mode (when all of the robot's joints move in a straight line). The fourth switch is set up to alternate the two modes. The executed URScript instructions are shown below.

In this example, the parameter "goalTolerance" (indicated in bold font above) may represent radians for the controller in yaw/rotation when achieving the robot's goal. It is noted that this parameter is not yet included in the URScript language and may thus represent an example extension to the syntax of the language.

Figure 5:
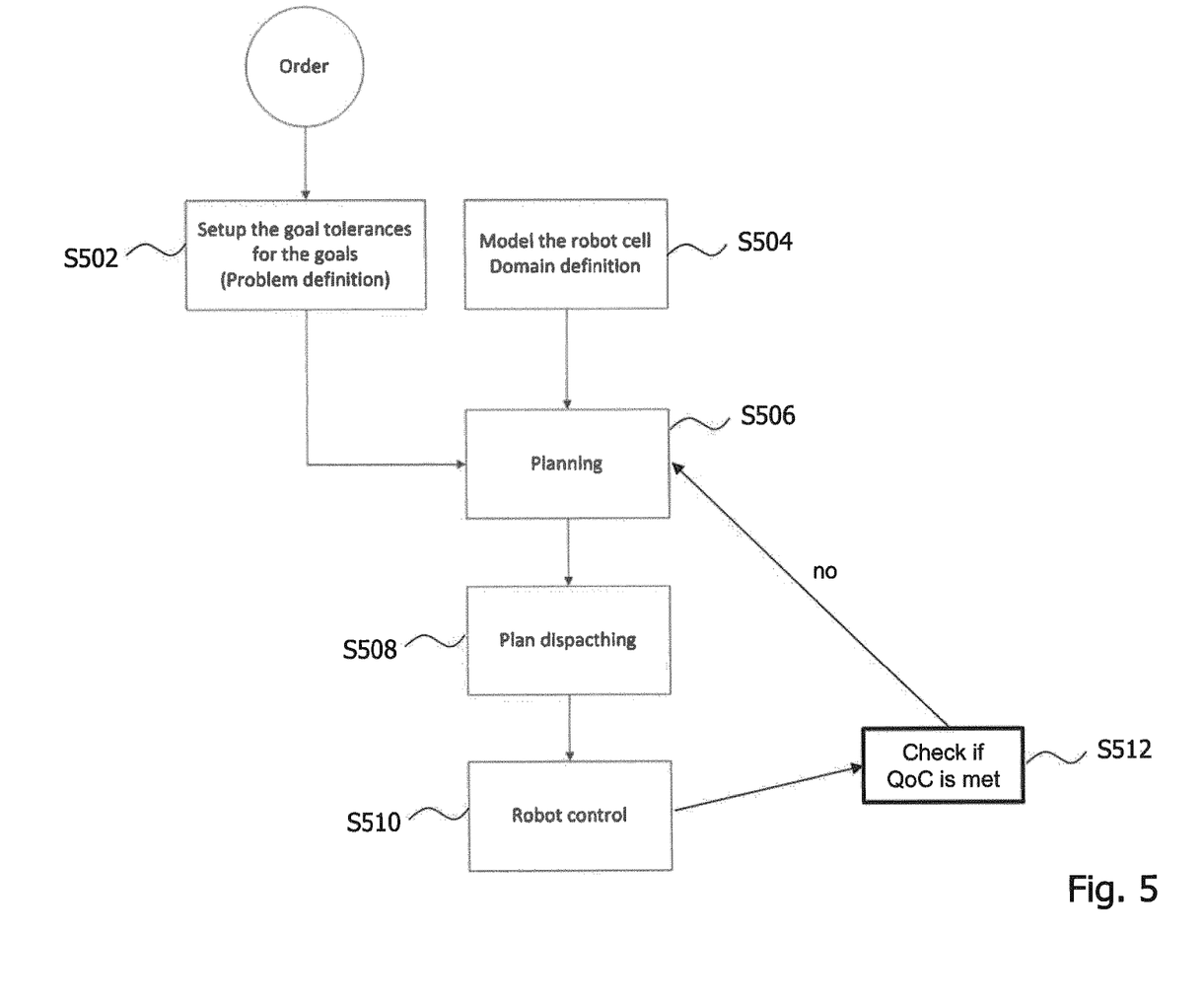
FIG. 5 illustrates a flowchart of an exemplary method of plan creation and dispatchment involving definitions of QoC tolerances according to the present disclosure.

FIG. 5 illustrates a flowchart of an exemplary method of plan creation and dispatchment involving definitions of QoC tolerances (or "goal tolerances") in the planning phase using a planning language, such one of the planning languages mentioned above. In case of an incoming order to be executed by the robot cell, the goal tolerances are set up for the goals to be achieved in step S502, e.g., in the problem definition. In step S504, a domain definition may be provided (or "modeled") for the robot cell and, in consideration of the problem definition and the domain definition, the planning mechanism may then create a plan in step S506. The plan may then be dispatched for low-level robot control in step S508 and, when robot control is being performed in step S510, the goal tolerances may be monitored and, also, a radio model may be updated continuously with measurements on the available radio capacity. If it is determined that goal tolerances are not met in step S512, replanning (or adjusting the mapping of robot control messages to QoS classes, as described above) may be triggered.

As has become apparent from the above, the present disclosure provides a technique for performing QoS control regarding control messages communicated from a robot controller to a robot via a mobile communication network in a cloud robotics system. According to the presented technique, it may possible to relax requirements in some operating phases of a robot, to thereby introduce some level of QoS awareness in industrial applications (e.g., comparable to consumer MBB). Current industrial standards do not support specifying that the result of some manufacturing processes may be loosely defined or can be imperfect/inaccurate, and therefore may not allow specifying situations, such as that the precise position of a part after a pick and place operation does not matter, e.g., because it will be transported (and shaken) in a truck, leading to displacement of the parts later on anyway, for example.

By relaxing requirements for a robotic cell, the whole manufacturing process may be accelerated and manufacturing cycle times may be reduced, while at the same time ensuring desired QoC targets as well as saving resource utilization in the control, networking and manufacturing domains. The presented technique may provide improved productivity of a robot cell since relaxing the goal tolerances may generally allow robot arms to move faster, wherein the resulting quality may still remain satisfying as relevant goal tolerances may be explicitly defined for certain parts of the process.

In order to save network resources, an analytics system may be designed to map control messages to different QoS classes, wherein higher priority messages may be mapped to more stringent and expensive QoS classes, wherein remaining messages may be mapped to best effort classes, for example, which may result in an improved utilization of radio network resources. The analytics system may continuously monitor if QoC targets are met and, in case of QoC violation, such as in case of an insufficient QoC level due to poor network conditions, control messages may be automatically mapped to higher priority QoS classes, thereby automatically eliminating QoC violation.

It is believed that the advantages of the technique presented herein will be fully understood from the foregoing description, and it will be apparent that various changes may be made in the form, constructions and arrangement of the exemplary aspects thereof without departing from the scope of the invention or without sacrificing all of its advantageous effects. Because the technique presented herein can be varied in many ways, it will be recognized that the invention should be limited only by the scope of the claims that follow.

The invention claimed is:

1. A method for performing Quality of Service, QoS, control regarding control messages communicated from a robot controller to a robot via a mobile communication network in a cloud robotics system, the method comprising:
   triggering mapping of control messages communicated from the robot controller to the robot to QoS classes among a plurality of data session related QoS classes supported by the mobile communication network for transmission of traffic via the mobile communication network, wherein each of the control messages is mapped to a respective QoS class depending on a Quality of Control, QoC, tolerance associated with the respective control message, wherein the mapping is adjusted based on QoC feedback provided by at least one of the robot and the robot controller, and wherein control messages with lower QoC tolerances are mapped to higher QoS classes, and control messages with higher QoC tolerances are mapped to lower QoS classes,
   communicating the control messages according to the triggered mapping.

2. The method of claim 1, wherein the QoC tolerance associated with the respective control message is predefined in accordance with an accuracy required by the robot for a control task to be performed in accordance with the respective control message.

3. The method of claim 1, wherein control messages belonging to a same control task to be performed by the robot are assigned the same QoC tolerance.

4. The method of claim 1, wherein the plurality of data session related QoS classes comprise at least a first QoS class and a second QoS class, the first QoS class having stricter QoS requirements than the second QoS class, wherein, among a plurality of control messages communicated from the robot controller to the robot, control messages having a lower QoC tolerance compared to other control messages of the plurality of control messages are mapped to the first QoS class and the other control messages are mapped to the second QoS class.

5. The method of claim 4, wherein the second QoS class is representative for best effort delivery of messages and, optionally, has the least strict QOS requirements among the plurality of data session related QoS classes.

6. The method of claim 1, wherein control of the robot by the robot controller is performed via a data session established by the mobile communication network, wherein the data session comprises a plurality of carriers through which traffic may flow, wherein, through each of the plurality of carriers, traffic is conveyed in accordance with a different QoS class of the plurality of data session related QoS classes.

7. The method of claim 1, wherein the QoC feedback is analyzed by an analytics component of the mobile communication network.

8. The method of claim 1, wherein the method is performed by one of an analytics component of the mobile communication network, a policy control component of the mobile communication network and a gateway component of the mobile communication network.

9. The method of claim 1, wherein the mapping is applied via a policy control component of the mobile communication network.

10. The method of claim 1, wherein, when the QoC feedback indicates that the QoC tolerance associated with at least one of the control messages is exceeded, the mapping of corresponding control messages is changed to a QoS class having stricter QoS requirements than the QoS class associated with the at least one of the control messages.

11. The method of claim 10, wherein changing the mapping of the corresponding control messages to a QoS class having stricter QoS requirements is repeatedly performed until QoC feedback provided by at least one of the robot and the robot controller indicates that the QoC tolerance associated with the corresponding control messages is not exceeded.

12. The method of claim 8, wherein, when the QoC feedback indicates that the QoC tolerance associated with at least some of the control messages is kept for a predetermined amount of time, the mapping of corresponding control messages is changed to a QoS class having less strict QoS requirements than the QoS class of the at least some of the control messages to determine whether the QoS class having less strict QoS requirements is sufficient to keep the QoC tolerance associated with the corresponding control messages.

13. The method of claim 1, wherein the QoC feedback is monitored only for QoS classes having stricter QoS requirements than the QoS class having the least strict QoS requirements among the plurality of data session related QoS classes to adjust the mapping.

14. The method of claim 1, wherein the QoC tolerance associated with the respective control message is defined using a planning language for specifying control tasks to be performed by the robot.

15. The method of claim 14, wherein the planning language supports defining at least one of:
   tolerance values specifying allowable inaccuracies when performing control tasks,
   predicates specifying conditions to be satisfied upon performing control tasks, and
   soft constraints specifying conditions that should, but not necessarily have to, be satisfied upon performing control tasks.

16. The method of claim 15, wherein the conditions relate to at least one of:
a placement of an item after performing the control task, and
an accumulated inaccuracy resulting from performing the control task.

17. A non-transitory computer readable medium comprising program code portions executable by processing circuitry of one or more computing devices whereby the one or more computing devices are operable to:
trigger mapping of control messages communicated from a robot controller to a robot to Quality of Service, QoS, classes among a plurality of data session related QoS classes supported by a mobile communication network for transmission of traffic via the mobile communication network, wherein each of the control messages is mapped to a respective QoS class depending on a Quality of Control, QoC, tolerance associated with the respective control message, wherein the mapping is adjusted based on QoC feedback provided by at least one of the robot and the robot controller, and wherein control messages with lower QoC tolerances are mapped to higher QoS classes, and control messages with higher QoC tolerances are mapped to lower QoS classes,
communicate the control messages according to the triggered mapping.

18. A computing unit for performing Quality of Service, QoS, control regarding control messages communicated from a robot controller to a robot via a mobile communication network in a cloud robotics system, the computing unit comprising at least one processor and at least one memory, the at least one memory containing instructions executable by the at least one processor such that the computing unit is operable to:
trigger mapping of control messages communicated from the robot controller to the robot to QoS classes among a plurality of data session related QoS classes supported by the mobile communication network for transmission of traffic via the mobile communication network, wherein each of the control messages is mapped to a respective QoS class depending on a Quality of Control, QoC, tolerance associated with the respective control message, wherein the mapping is adjusted based on QoC feedback provided by at least one of the robot and the robot controller, and wherein control messages with lower QoC tolerances are mapped to higher QoS classes, and control messages with higher QoC tolerances are mapped to lower QoS classes,
communicate the control messages according to the triggered mapping.

19. A cloud robotics system comprising a computing unit, a robot and a robot controller, wherein the computing unit is for performing Quality of Service, QoS, control regarding control messages communicated from the robot controller to the robot via a mobile communication network in a cloud robotics system, the computing unit comprising at least one processor and at least one memory, the at least one memory containing instructions executable by the at least one processor such that the computing unit is operable to:
trigger mapping of control messages communicated from the robot controller to the robot to QoS classes among a plurality of data session related QoS classes supported by the mobile communication network for transmission of traffic via the mobile communication network, wherein each of the control messages is mapped to a respective QoS class depending on a Quality of Control, QoC, tolerance associated with the respective control message, wherein the mapping is adjusted based on QoC feedback provided by at least one of the robot and the robot controller, and wherein control messages with lower QoC tolerances are mapped to higher QoS classes, and control messages with higher QoC tolerances are mapped to lower QoS classes,
communicate the control messages according to the triggered mapping.

* * * * *